United States Patent [19]
Lin

[11] Patent Number: 6,082,394
[45] Date of Patent: Jul. 4, 2000

[54] CLOSED TYPE WATER STORAGE CONTAINER WITH WATER LEVEL CONTROLLER AND AIR FILTERING DEVICE

[76] Inventor: Yi-Chang Lin, P.O. Box 82-144, Taipei, Taiwan

[21] Appl. No.: 09/275,979

[22] Filed: Mar. 25, 1999

[51] Int. Cl.[7] .................................................. F16K 24/04
[52] U.S. Cl. .......................... 137/341; 137/412; 137/545; 137/558; 137/587
[58] Field of Search .................................... 137/341, 412, 137/545, 558, 587

[56] References Cited

U.S. PATENT DOCUMENTS

4,624,279  11/1986  Arens et al. ..................... 137/238 X

*Primary Examiner*—Gerald A. Michalsky
*Attorney, Agent, or Firm*—A & J

[57] ABSTRACT

A closed type water storage container with water level controller and air filtering device, wherein the closed type water container is linked to the water level controlling device by a connection tube and the connection tube is provided with filtering materials for filtering of the moving water at the water level controlling device, such that water and air within the storage container are filtered and clean.

5 Claims, 12 Drawing Sheets

CLOSED TYPE WATER STORAGE CONTAINER WITH WATER LEVEL CONTROLLER AND AIR FILTERING DEVICE

BACKGROUND OF THE INVENTION (a) Field of the Invention

The present invention relates to a water storage container, and in particular, to a closed type water storage container mounted with a water level controller and an air filtering means, such that water and air within the storage container are filtered and clean.

(b) Description of the Prior Art

Sunlight, air and water are three essential elements that cannot be substituted by others. As known to everyone that clean water for drinking can only be obtained through complicated water treating processes and it cannot be obtained just from the tap itself. Water treating devices, such as reverse-osmosis water purifier, etc. have to be employed to first pre-treat the water prior to storage the water in the storage tank ready for use.

However, this storage tank for storing treated clean water is normally sealed or closed so as to avoid contamination. Thus, an external lining tube is mounted at one lateral side of the tank to observe the level of water in the storage tank. A water controller also mounted within the connection tube so that the water supply can be automatically controlled or supplied.

The water storage tank for the treated clean water is sealed and therefore the problem of contamination is not existing. However, in the linking tube where the water level controller is provided, prolong duration of moving water in the linking tube and the individual elements of the water level controller being within the water, various types of fungus may grow and pollute the water. In addition, the air that within the storage container may also pollute the storage water. Thus, it is an object of the present invention to overcome the drawbacks of the conventional water storage tank.

SUMMARY OF THE PRESENT INVENTION

Accordingly, it is an object of the present invention to provide a water storage container with water level controller and air filtering means, wherein the closed type water container is linked to the water level controlling device by a connection tube and the connection tube is provided with filtering materials for filtering of the moving water at he water level controlling device.

It is another object of the present invention to provide a water storage container with water level controller and air filtering means, wherein the reverse-flow water into the water storage container (when the water at the container is at a low level) is filtered and purified.

Yet another object of the present invention is to provide a water storage container with water level controller and air filtering means, wherein a filtering device is mounted with a guiding tube to the vent hole at the top end of the water storage container and the top end of the external tube of the water level controlling device is guided to the filtering device by a guiding tube, such that air entering the water container is purified and clean.

DETAILED DESCRIPTION OF THE PRESENT INVENTION

Figure 1:
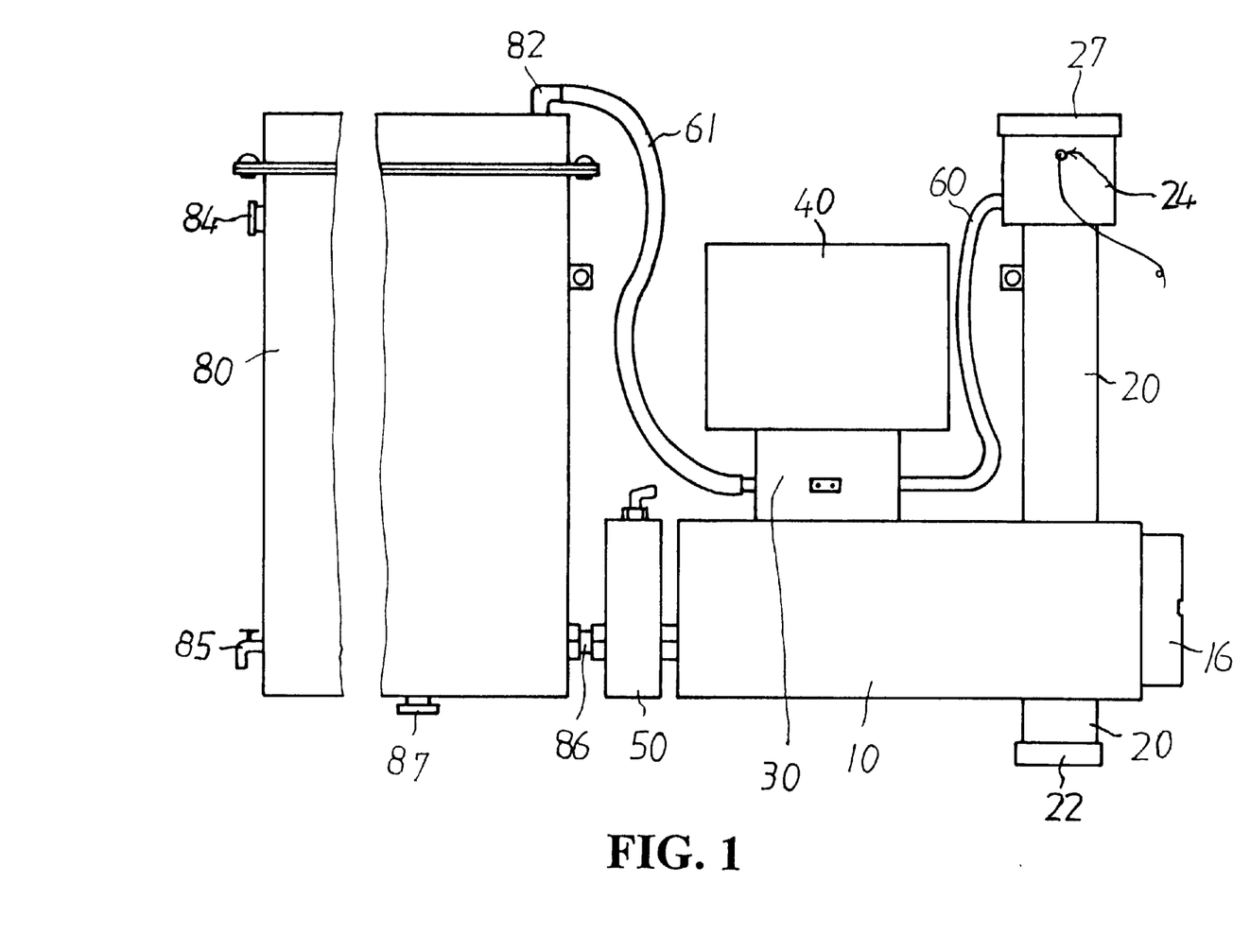
FIG. 1 is a schematic elevational view of the present invention.
Figure 2:
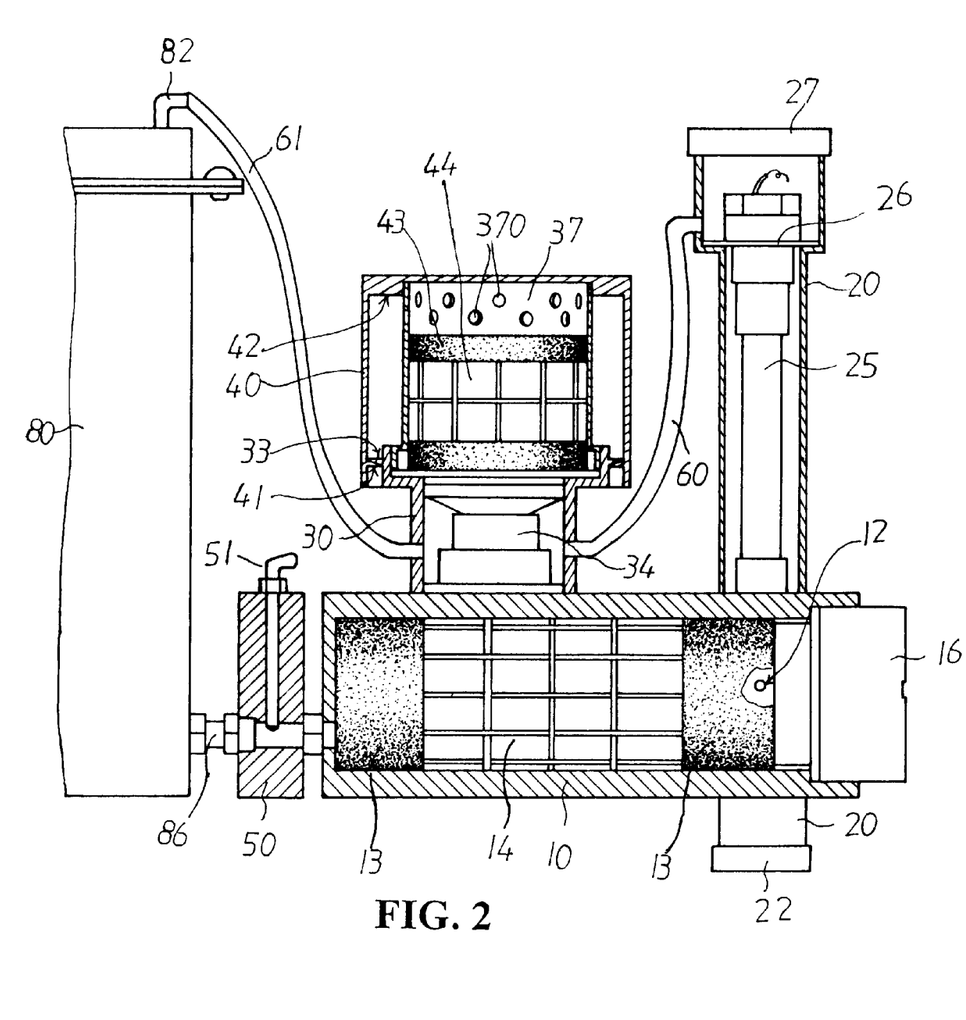
FIG. 2 is another schematic elevational view of the present invention.

The present invention will be described with reference to FIGS. 1 to 13. Referring to FIGS. 1 and 2, a storage tank 80 is connected to a base seat 10 at one side by a connection tube 86. The top end of the base seat 10 is mounted with a seat body 30 for an air filtering means. The lateral side of the base seat 10 is mounted to an external tube 20 of a water level controller 25.

Figure 3:
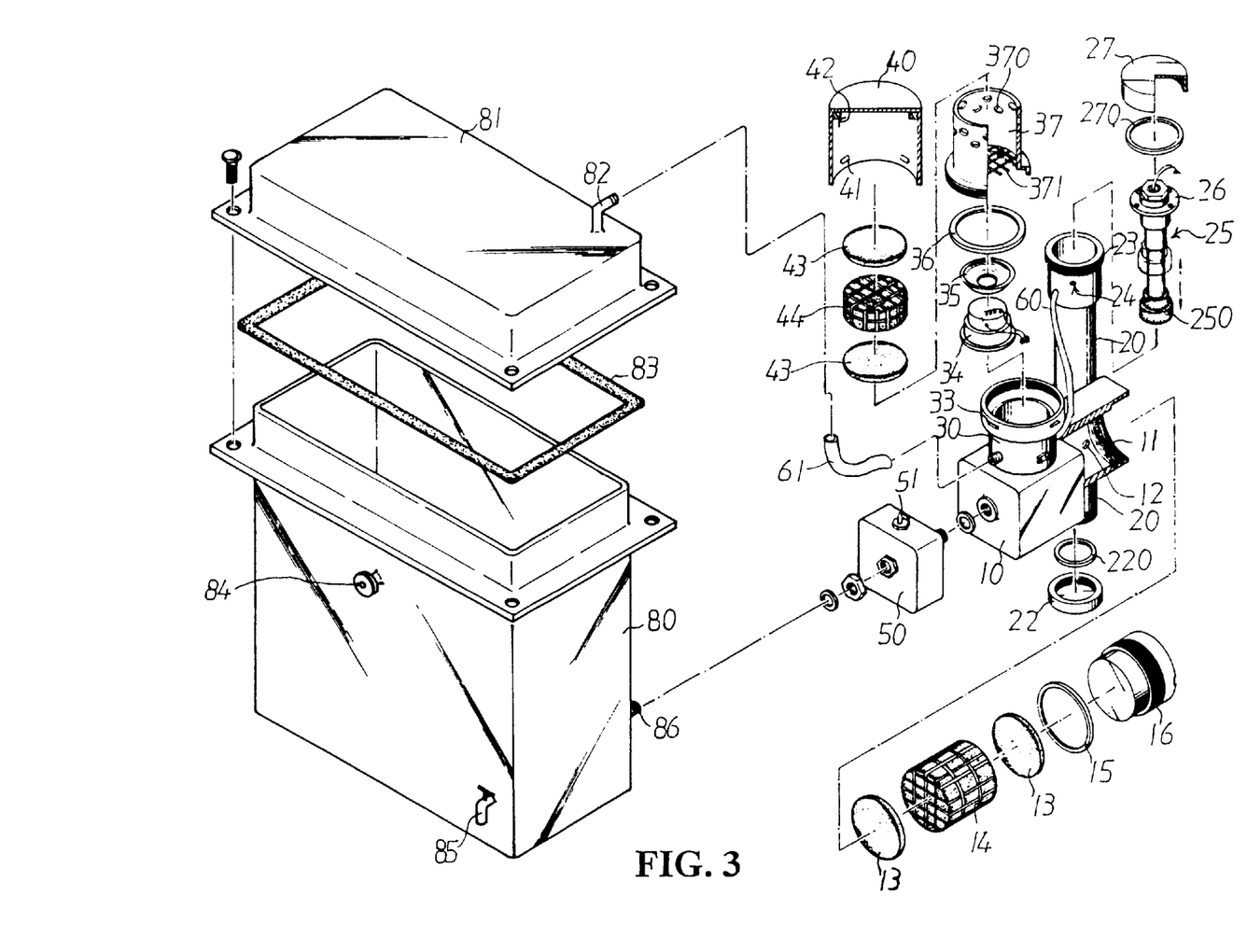
FIG. 3 is a perspective exploded view of the present invention.

In accordance with the present invention, and referring to FIG. 3, the present invention comprises (a) a linking tube means having a rectangular base seat 10 mounted to a valve seat 50 having a valve door 51, the valve seat 50 being mounted to the connection tube 86 at one lateral side of the storage tank 80, filtering materials 13 and a filtering block 14 being provided to the connection tube 86 therein and an end cap 16 being used to cap the filtering materials 13 and the filtering block 14 to the seat base 10, a vent hole 12 being provided at one lateral side of the base seat 10 for the connection to an external tube 20, and the top of the base seat 10 being provided with a seat body 30, the inner edge of the top end of the seat body 30 being provided with screw threads 31 and the external edge being a plurality of protruded teeth 33;

(b) a water level controlling means having a cylindrical external tube 20 mounted with a water level controller 25 having a float 250, the top end of the tube 20 being provided with screw threads 23 for the mounting of a top cap 27 with a washer 270 and to seal the top end, and a wire (not shown) from the water level controller 25 passed through a pore 24, the bottom end of the external tube 20 being sealed with a bottom cap 22 with a washer 220, the top end of the water level controller 25 being mounted with a fixing board 26 having a plurality of pores 260 for air venting and in communication with the external tube 20 and the pores 12 within the base seat 10; and (c) an air filtering means having a hat-shaped heating plate 34, a pressing plate 35 and a washer 36 being mounted in sequence to the seat body 30, a cylindrical engaging frame 37 having a plurality of holes 370 at the top end thereof being mounted at the external edge of the seat body 30, the bottom end of the engaging frame 37 being provided with a grating 371 for the mounting of filtering materials 43 and a filtering block 44, a hat-like cover 40 being provided with a plurality of protruded blocks 42 at the top end of the interior of the cover 40, the bottom end thereof being provided with a plurality of protruded elements 41 corresponding to the protruded teeth 33 at the external edge of the seat body 30, and the protruded teeth 33 being engageable with the protruded elements 41, the lateral side of the seat body 30 being connected to the top end of the external tube 20 and a guiding tube 61 being used to link the seat body 30 to the vent hole 82 at the storage tank 80 and a socket 32 at the seat body 30 linked to a power source (not shown) for the heating plate 34.

Figure 4:
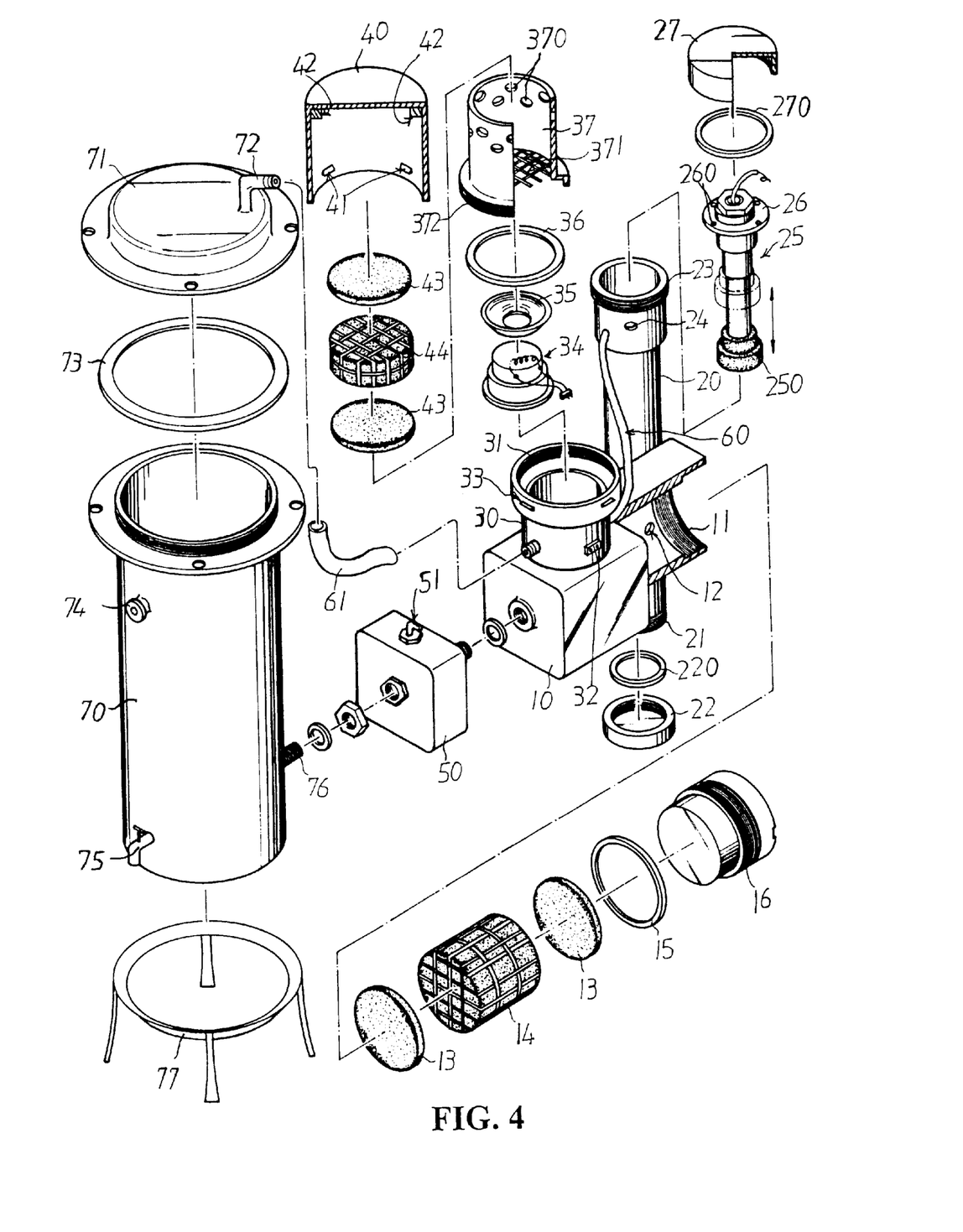
FIG. 4 is another perspective exploded view of the present invention.

In accordance with the present invention, and as shown in FIGS. 2 and 4, the storage tanks 80 or (70) possess a water inlet 84(74) and a water outlet 85(75) and a bottom water discharge 87(refer to FIG. 1), and the end cap 81(71) is provided with air vent 82(72) and is sealed with a washer 83(73). The storage 70 is supported with a support 77.

Referring again to FIGS. 1 to 4, the closed type water container (water storage tank 80, 70) is connected to the interior of the base seat 10 by means of connection tubes 86(76) via the valve body 50 and then in communication with the interior of the external tube 20 via the hole 12. Thus, the external tube 20 has the same water level with that of the storage tank 80 by means of the lining tube means and the level of the storage tank 80 is controlled by means of the water level controller 25.

In the preferred embodiment of the present invention, the storage tank 80 and the external tube 20 are sealed and closed. Thus, the water level up and level down movement are related to absorption and discharging of air. As a result, the guiding tubes 60, 61 respectively lead the air from the external tube 20 and the bottom seat 10 to flow into the bottom section of the seat body 30, and discharge or absorb via the gap between the engaging frame 37 and the cover 40.

Thus, when water level at the external tube 20 is at low level, water reverse flow to the storage tank 80 must flow through the filtering materials 13 and the filtering block 14 at the base seat 10 and filter without pollution. In addition, the absorbed air will also filter by the filtering materials 43 and filtering block 44 at the seat body 30 without polluting the storage water.

Further, the heating plate 34 mounted at the interior of the seat body 30 will evaporate the moisture of the air collected at the filtering materials 43 and filtering block 44 so that the materials 43 and the block 44 are always in dry condition and do not cause the growth of bacterial or fungus.

In addition, when the connection tube 86 connects the base seat 10 and the storage tank 80, the valve door 51 of the valve body 50 is used as an optional part. The base seat 10 has to be connected to the connection tube 86.

Figure 5:
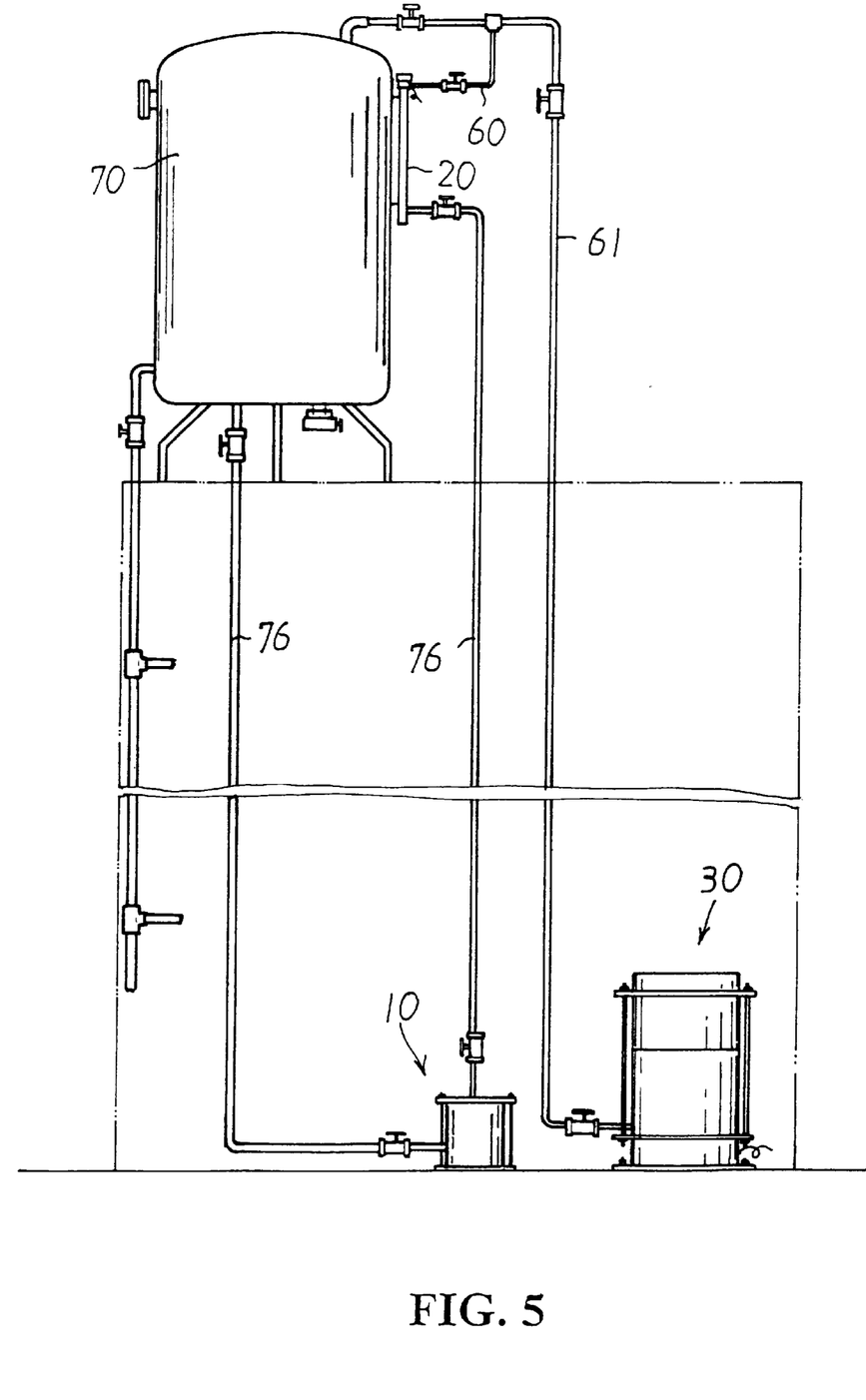
FIG. 5 is a schematic elevational view of another preferred embodiment of the present invention.
Figure 6:
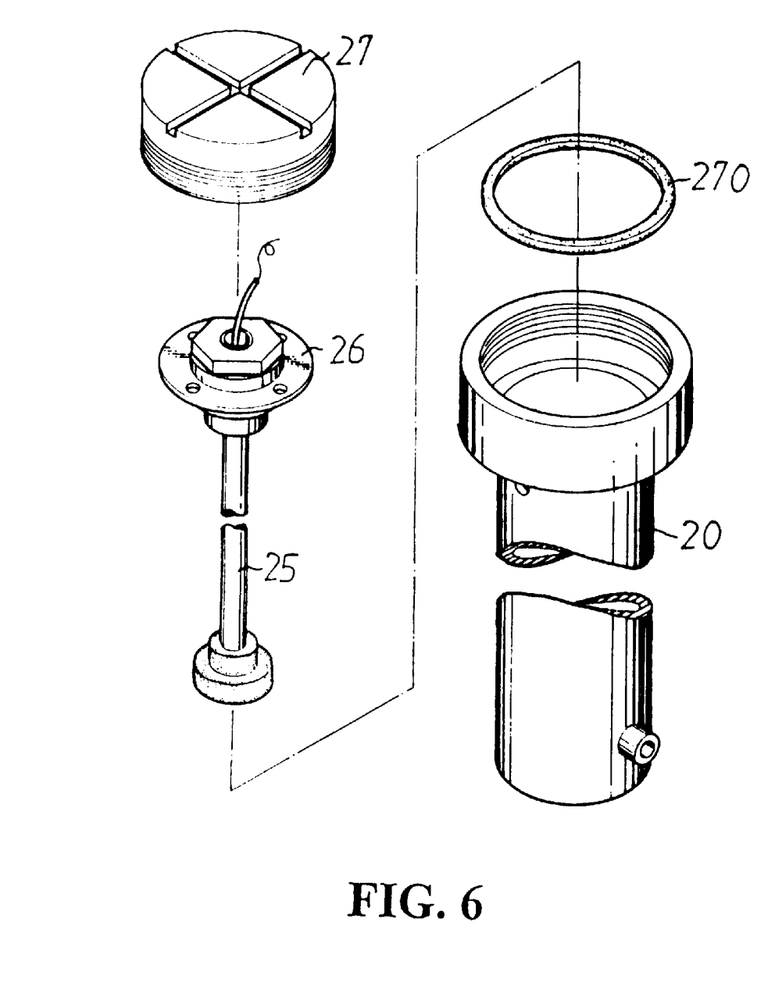
FIG. 6 is a perspective exploded view of the water level controlling device of the present invention.
Figure 7:
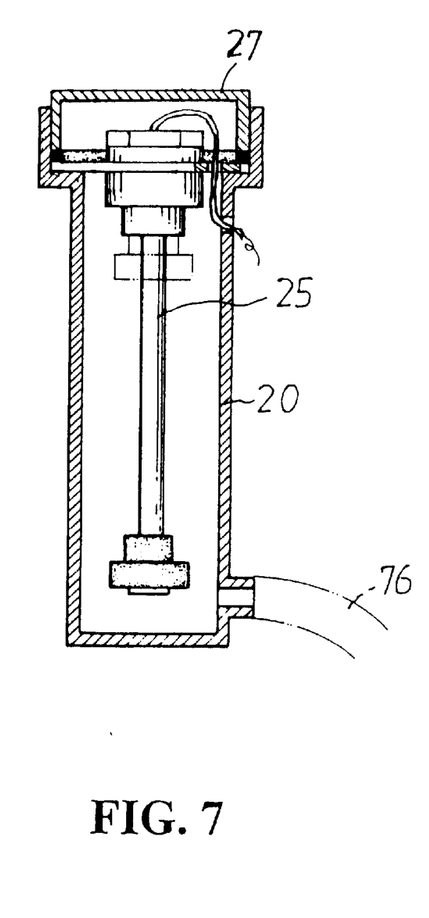
FIG. 7 is an elevational view of the water level controlling device of the present invention.
Figure 8:
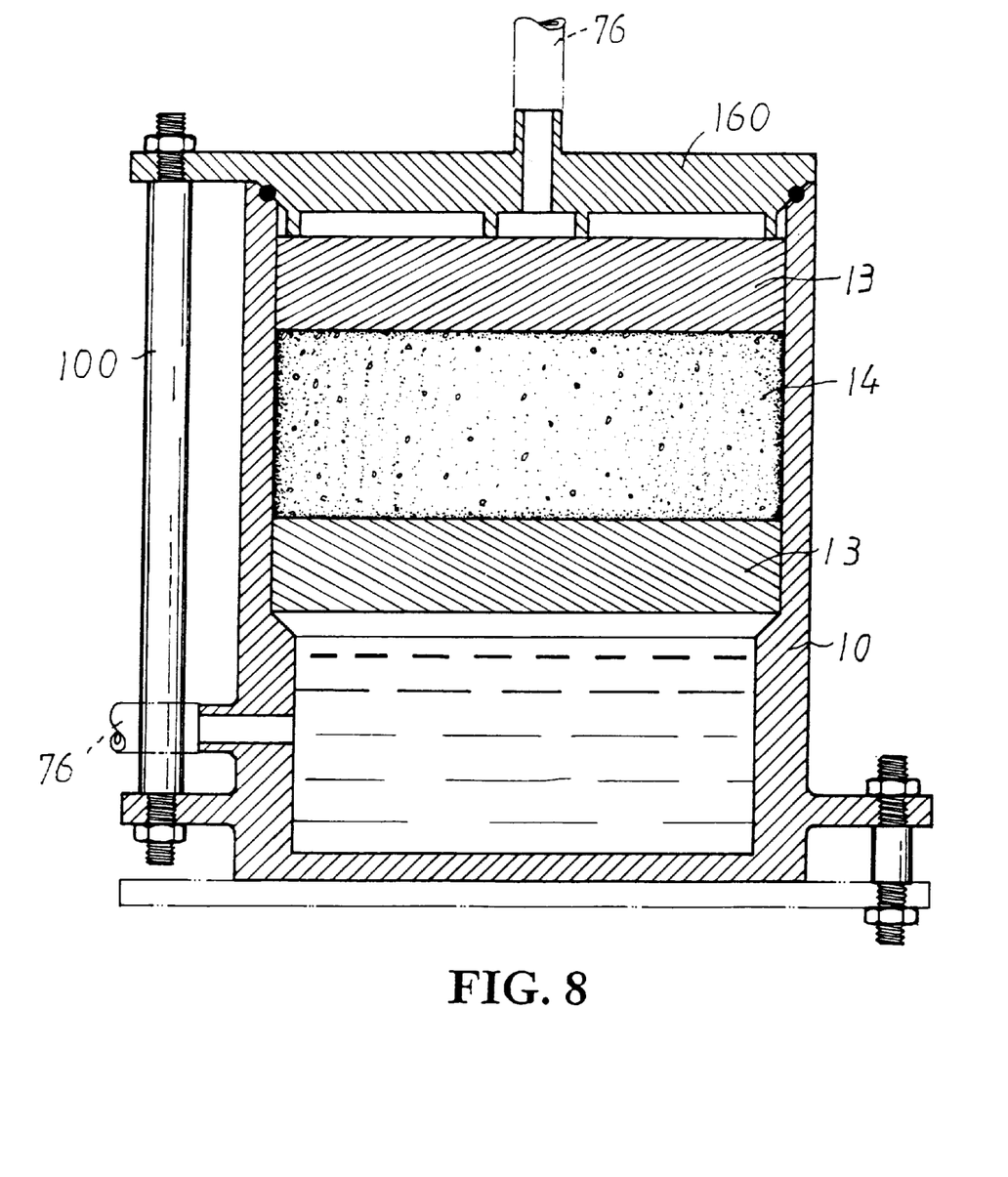
FIG. 8 is a sectional view of the linking tube structure of the present invention.
Figure 9:
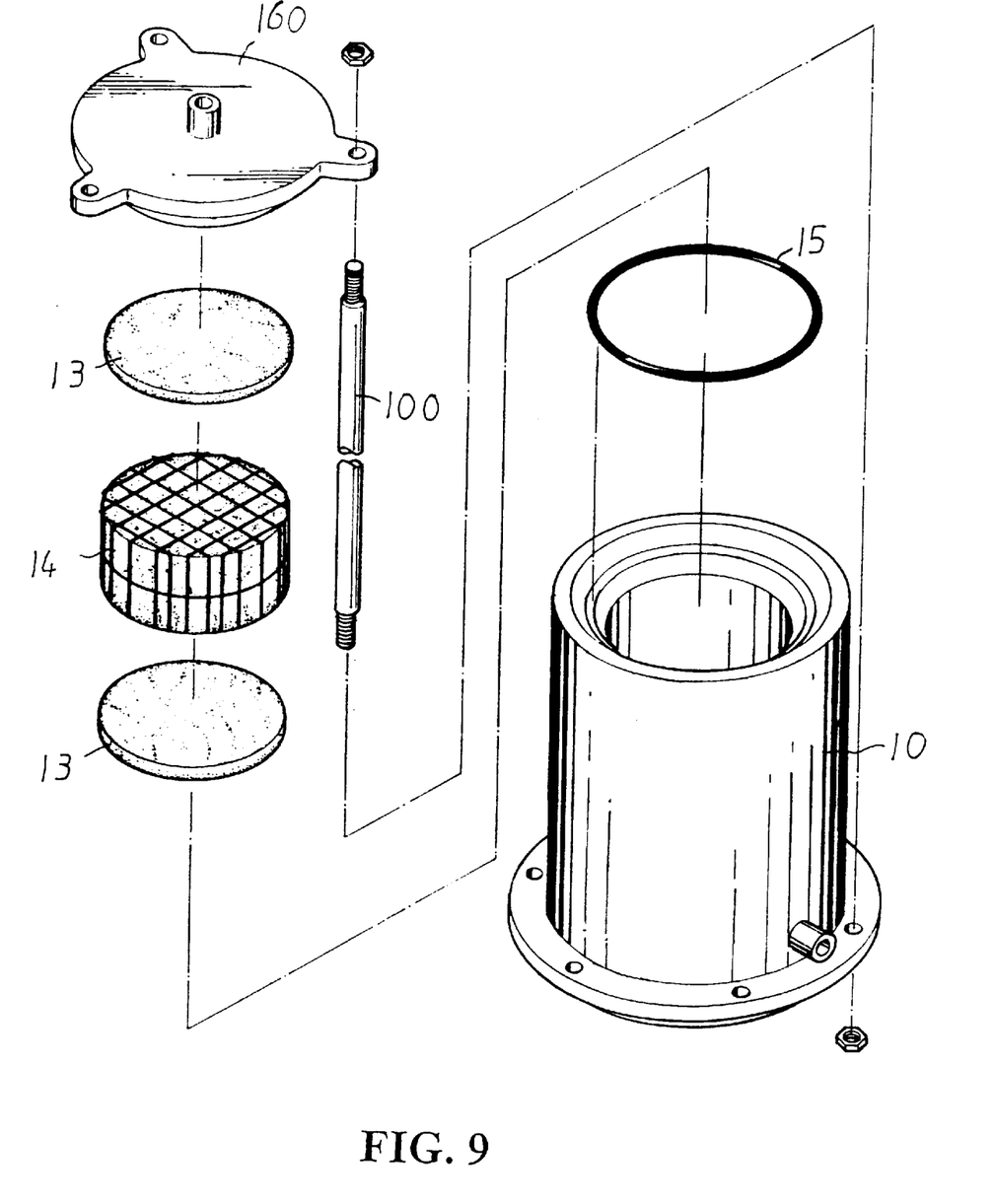
FIG. 9 is a perspective exploded view of the linking tube of the present invention.
Figure 10:
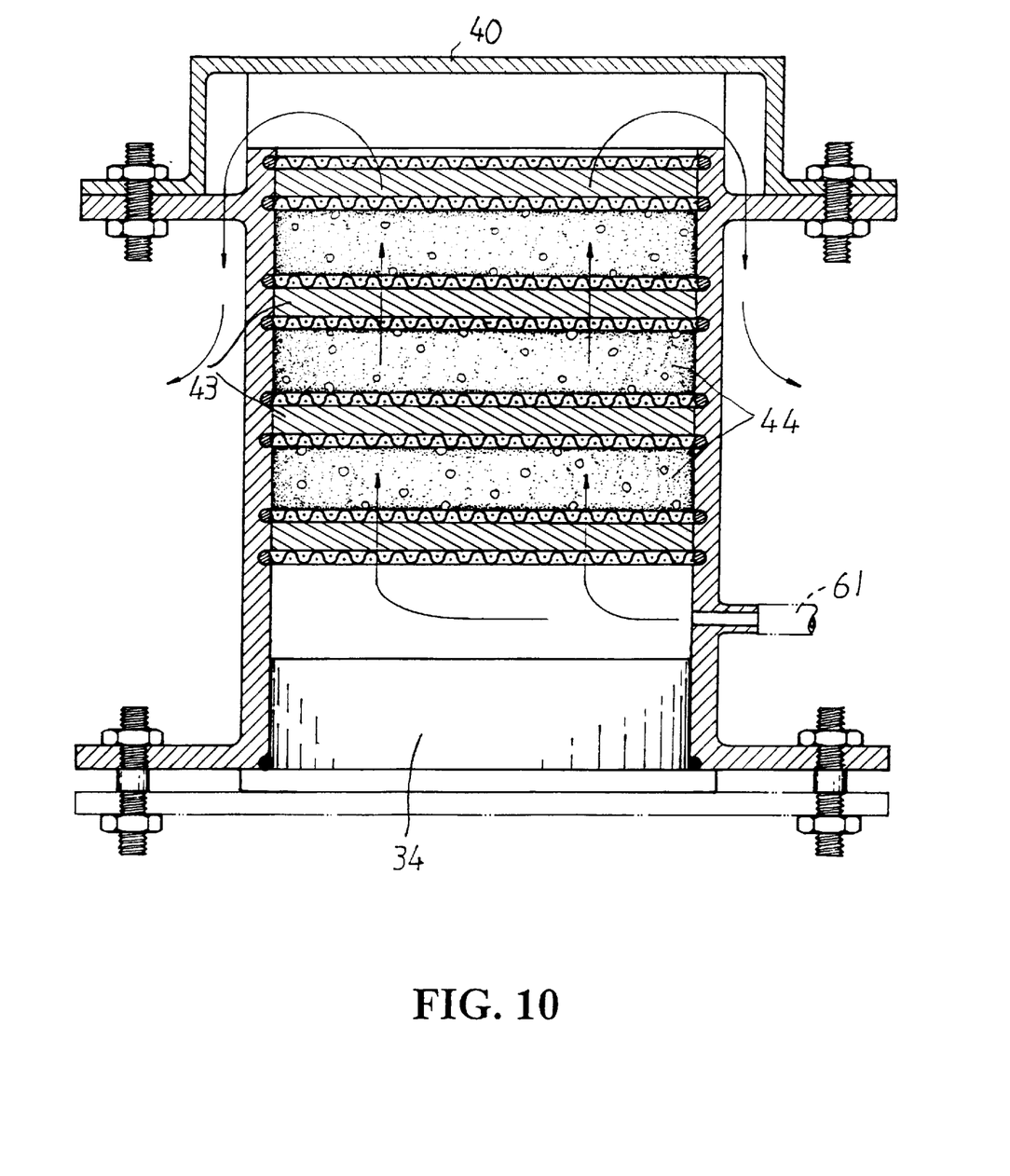
FIG. 10 is a sectional view of the air filtering device of the present invention.
Figure 11:
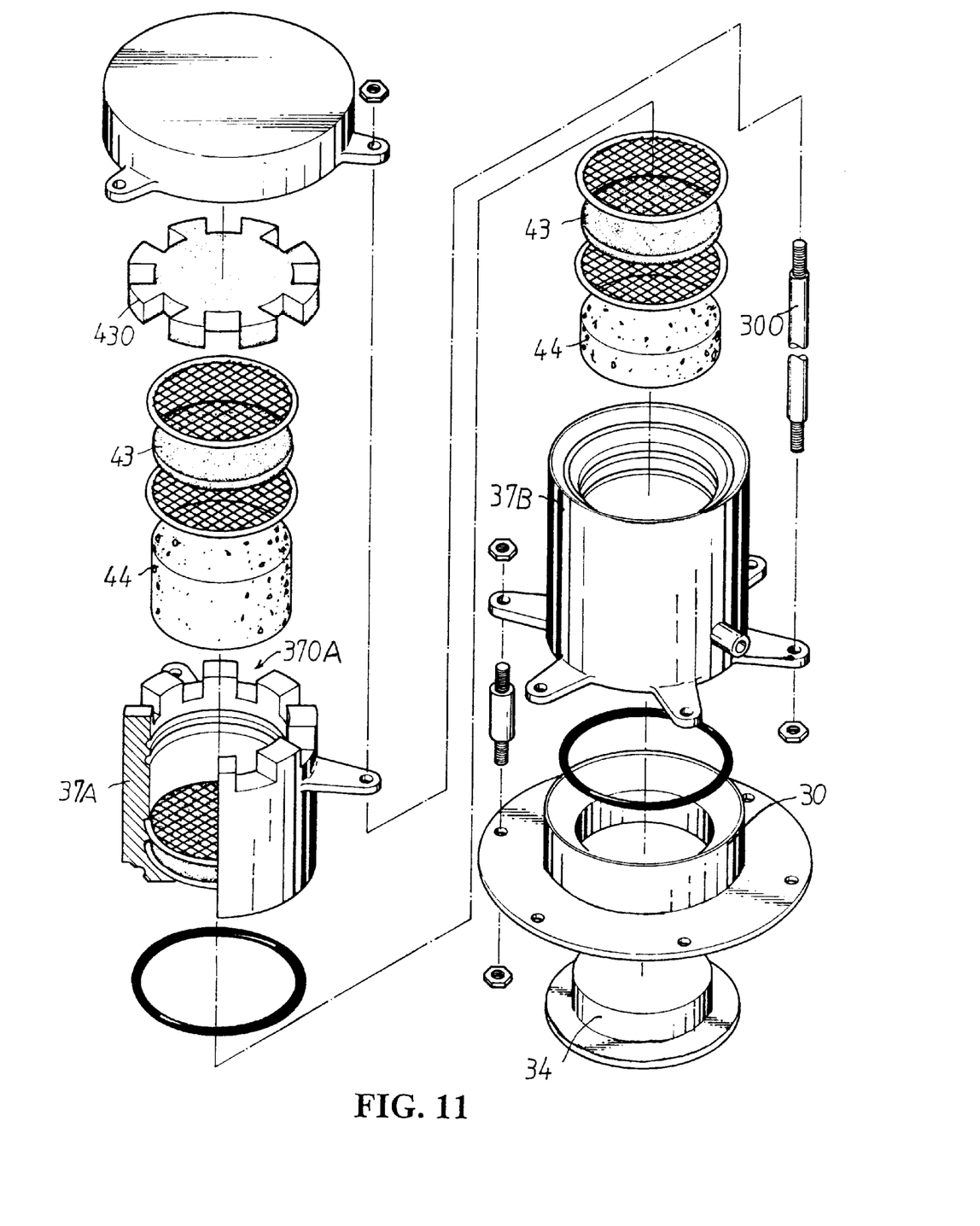
FIG. 11 is a perspective exploded view of the air filtering device of the present invention.
Figure 12:
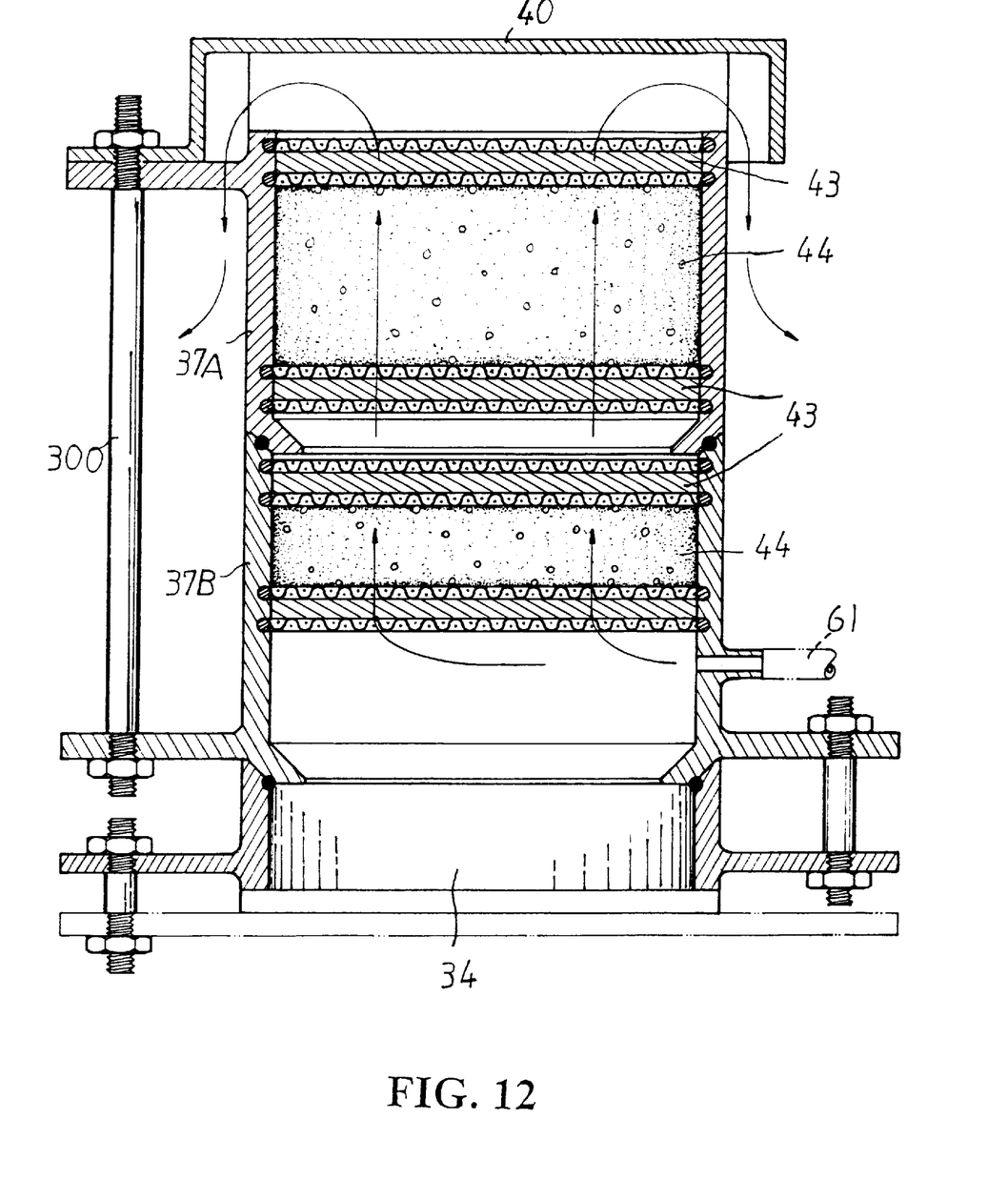
FIG. 12 is a sectional view of another air filtering structure of the present invention.
Figure 13:
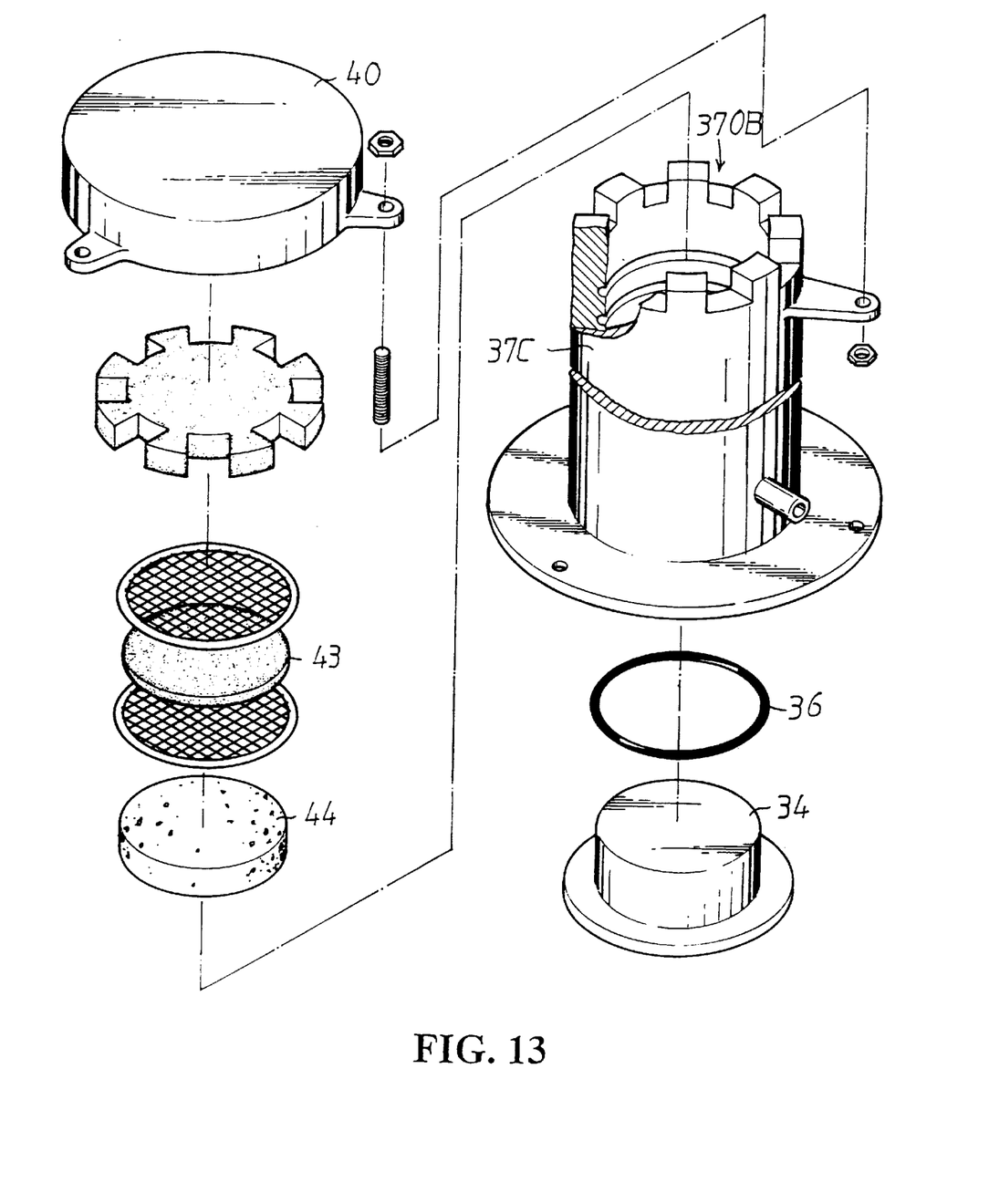
FIG. 13 is a perspective exploded view of another air filtering structure of the present invention.

As shown in FIG. 5, there is shown a large storage tank 70 used in another preferred embodiment of the present invention. In this case, the water level controlling means, the linking tube means and the air filtering means can be linked together by the connection tube 76, the guiding tubes 60, 61. The water level controller (as shown in FIGS. 6 and 7) is mounted to the storage tank 70 at one lateral side, and the linking tube means (refer to FIGS. 8 and 9) and the air filtering means (FIGS. 10, 11 or 12 or 13) is mounted at an appropriate low level position to allow convenient maintenance (such as change of the filtering materials 13, 43, and the filtering blocks 14, 44) without climbing to a higher position to provide maintenance.

In accordance with the present invention, and referring to FIGS. 10, 11 or 12, 13, the air filtering device has a cylindrical shape engaging frame 37A, 37B or 37C to mount the filtering materials 43, and the filtering block 44 and is secured with a screw rod 300 to the wall or the floor.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that falls within the scopes of the invention.

I claim:

1. The water storage container with water level controller and air filtering means comprising
    (a) a linking tube means having a rectangular base seat mounted to a valve seat having a valve door, the valve seat being mounted to the connection tube at one lateral side of the storage tank, filtering materials and a filtering block being provided to the connection tube therein and an end cap being used to cap the filtering materials and the filtering block to the seat base, a vent hole being provided at one lateral side of the base seat for the connection to an external tube, and the top of the base seat being provided with a seat body, the inner edge of the top end of the seat body being provided with screw threads and the external edge being a plurality of protruded teeth;
    (b) a water level controlling means having a cylindrical external tube mounted with a water level controller having a float, the top end of the tube being provided with screw threads for the mounting of a top cap with a washer and to seal the top end, the bottom end of the external tube being sealed with a bottom cap with a washer, the top end of the water level controller being mounted with a fixing board having a plurality of pores for air venting and in communication with the external tube and the pores within the base seat; and
    (c) an air filtering means having a hat-shaped heating plate, a pressing plate and a washer being mounted in sequence to the seat body, a cylindrical engaging frame having a plurality of holes at the top end thereof being mounted at the external edge of the seat body, the bottom end of the engaging frame being provided with a grating for the mounting of filtering materials and a filtering block, a hat-like cover being provided with a plurality of protruded blocks at the top end of the interior of the cover, the bottom end thereof being provided with a plurality of protruded elements corresponding to the protruded teeth at the external edge of the seat body, and the protruded teeth being engageable with the protruded elements, the lateral side of the seat body being connected to the top end of the external tube and a guiding tube being used to link the seat body to the vent hole at the storage tank and a socket at the seat body linked to a power source for the heating plate.

2. The water storage container with water level controller and air filtering means as set forth in claim 1, wherein the front end of the bottom seat of the connection tube is provided with a valve.

3. The water storage container with water level controller and air filtering means as set forth in claim 1, wherein a circular heating plate is provided to dry the moisture contained in the filtering materials and filtering block.

4. The water storage container with water level controller and air filtering means as set forth in claim 1, wherein the linking tube means, the air filtering means are connected to the storage tank via a plurality of tubes, and the water level controlling means is mounted at a lower position facilitating maintenance.

5. The water storage container with water level controller and air filtering means as set forth in claim 4, wherein the linking tube means and the air filtering means contain one or a plurality of cylindrical engaging frame containing the filtering materials and filtering block.

* * * * *